US008762107B2

(12) United States Patent
Pelegri et al.

(10) Patent No.: US 8,762,107 B2
(45) Date of Patent: Jun. 24, 2014

(54) TRIAXIAL INDUCTION CALIBRATION WITHOUT PRIOR KNOWLEDGE OF THE CALIBRATION AREA'S GROUND CONDUCTIVITY

(75) Inventors: Luis Pelegri, Humble, TX (US); Hans-Martin Maurer, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 352 days.

(21) Appl. No.: 13/189,976

(22) Filed: Jul. 25, 2011

(65) Prior Publication Data
US 2012/0078558 A1 Mar. 29, 2012

Related U.S. Application Data

(60) Provisional application No. 61/386,738, filed on Sep. 27, 2010.

(51) Int. Cl.
*G01V 3/18* (2006.01)
(52) U.S. Cl.
USPC ............ 702/185; 702/7; 702/85; 703/10; 324/338; 324/339; 219/121.11
(58) Field of Classification Search
USPC ........... 702/185, 7, 85; 703/10; 324/338, 339; 219/121.11
See application file for complete search history.

(56) References Cited

U.S. PATENT DOCUMENTS

| 4,439,831 | A | * | 3/1984 | Sinclair | 702/7 |
| 4,837,517 | A | | 6/1989 | Barber | |
| 5,065,099 | A | * | 11/1991 | Sinclair et al. | 324/339 |
| 5,157,605 | A | | 10/1992 | Chandler et al. | |
| 5,278,507 | A | * | 1/1994 | Bartel et al. | 324/338 |
| 5,293,128 | A | | 3/1994 | Zhou | |
| 5,452,761 | A | | 9/1995 | Beard et al. | |
| 5,600,246 | A | | 2/1997 | Forgang et al. | |
| 5,656,930 | A | * | 8/1997 | Hagiwara | 324/339 |

(Continued)

FOREIGN PATENT DOCUMENTS

WO 9800733 8/1998

OTHER PUBLICATIONS

Notification of Transmittal of the International Search Report and the Written Opinion of the International Searching Authority, or the Declaration; PCT/US2011/050663; Apr. 10, 2012.

(Continued)

*Primary Examiner* — Carol S Tsai
(74) *Attorney, Agent, or Firm* — Cantor Colburn LLP

(57) ABSTRACT

Disclosed is a method for determining calibration factors of an induction tool that includes three receiver coils, each having a distinct orientation. The method includes: placing the induction logging tool in a first position at a first height above a surface of the earth; performing a first set of measurements of conductivity using the receiver coils with the induction logging tool in the first position at the first height; placing the induction logging tool in a second position at a second height above the surface of the earth; performing a second set of measurements of conductivity using the receiver coils with the induction logging tool in the second position at the second height; and determining the calibration factors that correct conductivity measurements performed by the induction logging tool in a borehole penetrating the earth using the first and second sets of measurements.

17 Claims, 5 Drawing Sheets

(56) References Cited

U.S. PATENT DOCUMENTS

| | | |
|---|---|---|
| 5,781,436 A | 7/1998 | Forgang et al. |
| 5,884,227 A | 3/1999 | Rabinovich et al. |
| 5,999,883 A | 12/1999 | Gupta et al. |
| 6,586,939 B1 | 7/2003 | Fanini et al. |
| 6,603,312 B2 * | 8/2003 | Sinclair ................. 324/339 |
| 6,900,640 B2 | 5/2005 | Fanini et al. |
| 7,010,429 B2 * | 3/2006 | Xiao ........................... 702/7 |
| 7,027,923 B2 * | 4/2006 | Barber et al. ............... 702/7 |
| 7,031,839 B2 | 4/2006 | Tabarovsky et al. |
| 7,386,430 B2 | 6/2008 | Barber et al. |
| 2003/0004647 A1 * | 1/2003 | Sinclair ......................... 702/7 |
| 2003/0028324 A1 | 2/2003 | Xiao et al. |
| 2003/0076107 A1 | 4/2003 | Fanini et al. |
| 2004/0113609 A1 | 6/2004 | Homan et al. |
| 2005/0040828 A1 * | 2/2005 | Xiao ................. 324/339 |
| 2005/0088181 A1 | 4/2005 | Barber et al. |
| 2005/0127917 A1 * | 6/2005 | Barber ......................... 324/338 |
| 2005/0143920 A1 * | 6/2005 | Barber et al. ................ 702/7 |
| 2005/0156601 A1 | 7/2005 | Dupuis et al. |
| 2006/0132138 A1 | 6/2006 | Pelegri et al. |
| 2006/0164092 A1 | 7/2006 | Forgang et al. |
| 2006/0192562 A1 | 8/2006 | Davydychev et al. |
| 2006/0208737 A1 | 9/2006 | Merchant et al. |
| 2007/0103160 A1 | 5/2007 | Pelegri |
| 2007/0115000 A1 | 5/2007 | Merchant et al. |
| 2007/0216416 A1 | 9/2007 | Itskovich |
| 2010/0097065 A1 | 4/2010 | Itskovich et al. |

OTHER PUBLICATIONS

Moran et al.; Basic Theory of Induction Logging and Application to Study of Two-Coil Sondes, Geophysics, vol. XXVII, No. 6, Part 1 (Dec. 1962), pp. 829-858.

Smith et al,; The usefulness of multicomponent, time-domain airborne electromagnetic measurements, Geophysics, vol. 61, No. 1 (Jan.-Feb. 1996), pp. 74-81, 17 figs.

Tabarovskii et al.; Radial Characteristics of Induction Focusing Probes with Transverse Detectors in an Anisotropic Medium, Geologiya I Geofizika (Soviet Geology and Geophysics), vol. 20, No. 7, 1979, pp. 96-110.

Tabarovsky et al.; Geometric and Frequency Focusing in Exploration of Anisotropic Seams, Nauka, USSR Academy of Science, Siberian Division, Novosibirsk, (1982), 62 Pages.

McNeill, JD. "Electromagnetic Terrain Conductivity Measurement at Low Induction Numbers," Geonics Limited, Oct. 1980.pp. 1-15.

Yuan, Simulation of FUll responses of a triaxial induction tool in a homogeneous biaxial anisotropic formation, Mar.-Apr. 2010, vol. 7, No. 2, Geophysics.

\* cited by examiner

TRIAXIAL INDUCTION CALIBRATION WITHOUT PRIOR KNOWLEDGE OF THE CALIBRATION AREA'S GROUND CONDUCTIVITY

CROSS REFERENCE TO RELATED APPLICATIONS

This application claims the benefit of an earlier filing date from U.S. Provisional Application Ser. No. 61/386,738 filed Sep. 27, 2010, the entire disclosure of which is incorporated herein by reference.

BACKGROUND

1. Field of the Invention

The invention disclosed herein relates to a method for calibrating downhole tools and, in particular, to downhole tools configured to measure electrical resistivity by induction.

2. Description of the Related Art

A borehole is typically drilled into a geologic formation for various applications such as carbon sequestration, geothermal production, and hydrocarbon exploration and production. In order to efficiently use expensive drilling resources, it is important to acquire detailed information concerning the properties of the geologic formation.

A logging or downhole tool can be used to acquire this information. The tool is disposed in the borehole by wireline for wireline logging or in a collar attached to a drill string for logging-while-drilling applications. Many different types of tools can be used to measure different properties of the formation.

One type of tool is an induction logging tool used to measure the resistivity of the formation as a function of depth in the borehole. Variations in the measured resistivity can be plotted or displayed to produce a resistivity image of the formation. In order to measure the resistivity, the induction logging tool transmits electromagnetic waves into the formation using a transmitter coil. The electromagnetic waves induce circulating currents in the formation. The magnitude of the circulating currents vary in response to variations of the resistivity of the formation. The circulating currents in turn emit electromagnetic waves that induce a signal in a receiver coil at the tool. The received signal is related to the magnitude of the circulating currents and, thus, the resistivity of the formation.

Because the induction logging tool must be sensitive to low levels of electromagnetic waves induced by the circulating currents in the formation, it is important for the tool to be calibrated properly. A proper calibration will exclude any influences from a calibration environment that may interfere with the calibration due to the sensitivity of the tool. It would be well received in art if the calibration of induction logging tools could be improved.

BRIEF SUMMARY

A method for determining calibration factors of an induction logging tool, the method includes: placing the induction logging tool in a first position at a first height above a surface of the earth, the induction logging tool having a first receiver coil, a second receiver coil, and a third receiver coil, each receiver coil having a distinct orientation; performing a first set of measurements of conductivity using the first, second, and third receiver coils with the induction logging tool in the first position at the first height; placing the induction logging tool in a second position at a second height above the surface of the earth; performing a second set of measurements of conductivity using the first, second, and third receiver coils with the induction logging tool in the second position at the second height; and determining the calibration factors that correct conductivity measurements performed by the induction logging tool in a borehole penetrating the earth using the first and second sets of measurements.

A non-transitory computer readable medium comprising computer executable instructions for determining calibration factors of an induction logging tool by implementing a method that includes: performing a first set of measurements of conductivity using a first receiver coil, a second receiver coil, and a third receiver coil of the induction logging tool placed in a first position at a first height above a surface of the earth; performing a second set of measurements of conductivity using the first receiver coil, the second receiver coil, and the third receiver coil of the induction logging tool placed in a second position at a second height above the surface of the earth; determining the calibration factors that correct conductivity measurements performed by the induction logging tool in a borehole penetrating the earth using the first and second sets of measurements; and providing the calibration factors as output.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
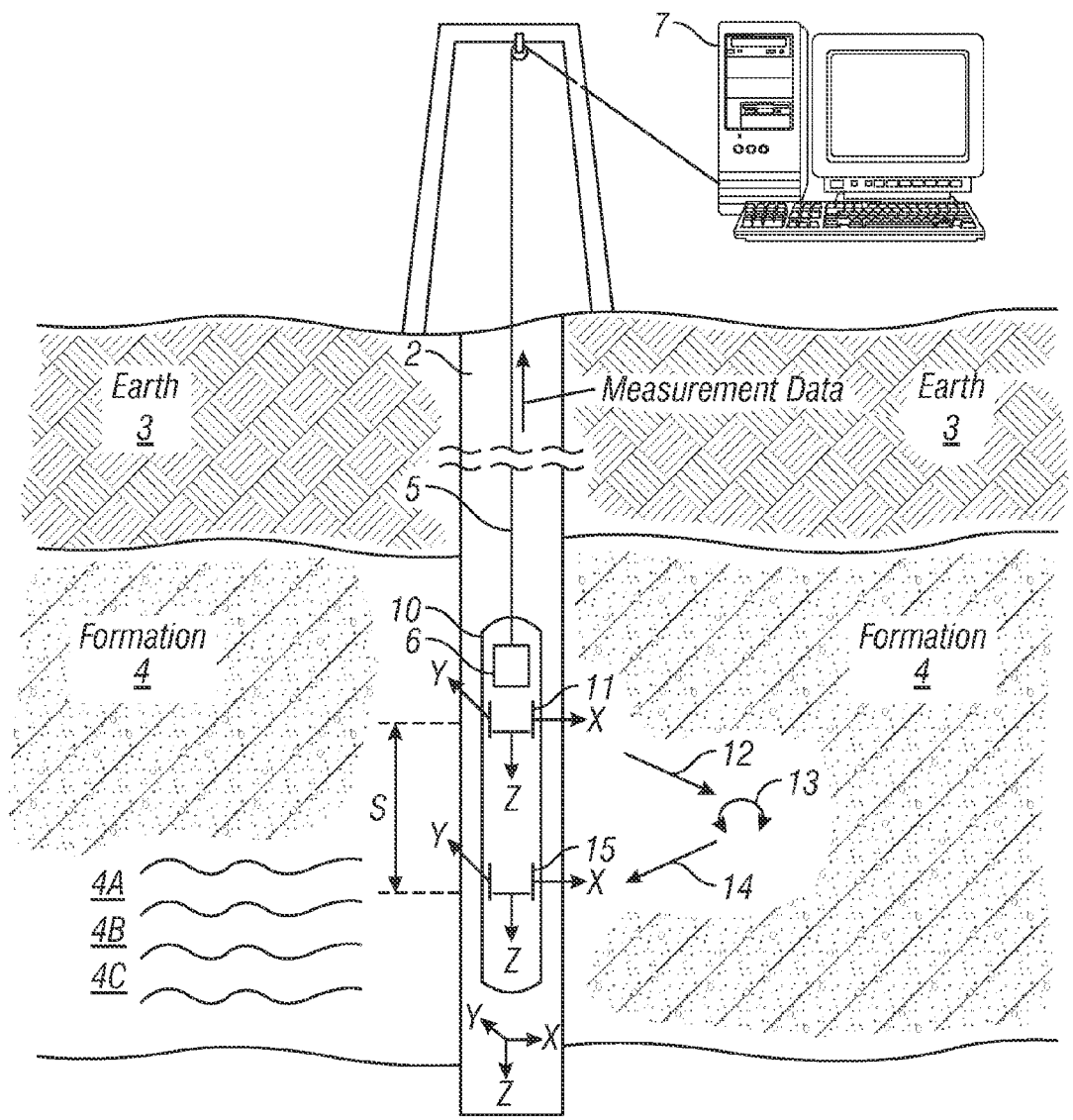
FIG. 1 illustrates an exemplary embodiment of an induction logging tool disposed in a borehole penetrating the earth.

FIG. 1 illustrates an exemplary embodiment of an induction logging tool 10 disposed in a borehole 2 penetrating the earth 3, which includes an earth formation 4. The earth formation includes layers 4A-4C. The induction logging tool 10 is conveyed through the borehole 2 by a carrier 5. In the embodiment of FIG. 1, the carrier 5 is an armored wireline. Besides supporting the downhole tool 10 in the borehole 2, the wireline can also provide communications between the induction logging tool 10 and a computer processing system 7 disposed at the surface of the earth 3. In logging-while-drilling (LWD) or measurement-while-drilling (MWD) embodiments, the carrier 4 can be a drill string. In order to operate the induction logging tool 10 and/or provide a communications interface with the surface computer processing system 7, the induction logging tool 10 includes downhole electronics 6.

The logging tool 10 is configured to measure the electrical resistivity of the formation 4 as a function of depth. A resistivity image of the formation 4 can be produced from the resistivity measurements by displaying variations of the resistivity along the longitudinal axis of the borehole 2. Hence, the resistivity image can display locations and boundaries of the formation layers 4A-4C.

Still referring to FIG. 1, the logging tool 10 includes three orthogonally oriented transmitter coils (or antennas) 11 that are configured to transmit first electromagnetic energy 12 into the earth formation 4. The transmitted electromagnetic energy 12 induces circulating electric currents 13 in the formation 4. The circulating currents 13 in turn transmit second electromagnetic energy 14 that is received by three orthogonally oriented receiver coils (or antennas) 15. Variations in the magnitude of signals induced in the receiver coils 15 due to the second electromagnetic energy 14 relate to variations of the resistivity or its inverse conductivity of the formation 4.

The transmitter coils 11 and the receiver coils 15 are oriented along either of the X, Y, or Z axes as shown in FIG. 1. The Z-axis is the longitudinal axis of the induction logging tool 10 and is generally aligned with the longitudinal axis of the borehole 2 as the logging tool 10 is conveyed through the borehole 2. The direction of orientation a coil relates to the direction of a magnetic field that would be generated if current flowed through the coil. The direction is generally normal to the plane in which the coil lies.

Calibration

The induction logging tool 10 requires calibration in order to obtain accurate and precise resistivity/conductivity measurements. In general, the calibration results in obtaining a multiplicative calibration factor and an additive calibration factor for each set of transmit/receive coils 11/15 oriented along the same axis. In one embodiment, the multiplicative calibration factor is used to multiply the output and then the additive calibration factor is added to the product.

One example of a calibration is a two-point calibration. In a two-point calibration, the induction logging tool 10 is placed in two "known" environments. One environment is a low or non-conductive environment and the other environment is a high conductive environment. In each known environment, the tool 10 is operated and the outputs measured. By algebraic manipulation, the multiplicative calibration factor and additive calibration factor are determined.

Ideally, one of the known environments is non-conductive (0 mSm), i.e., far from any conductive material. In this way, one essentially obtains the additive calibration factor, which is referred to as the sonde error. In actual practice, the measurement is made in a nearly non-conductive environment. The tool 10 is placed high above ground level far from any conductive material in a designated calibration area. The small remaining ground conductivity effects can be measured with a calibrated instrument or obtained through modeling. This minute environmental effect is then applied to the additive term as a "ground correction".

The high conductive environment is created using a calibration "loop" that magnetically couples the output of one selected transmitter coil 11 to the associated receiver coil 15 having the same orientation in a precisely known fashion. The geometry is precisely determined and the electrical parameters of the calibration loop are known precisely. The mutual magnetic coupling between calibration loops, the transmitter coils 11 and the receivers coils 15 are accurately calculated using the geometry details.

The coupling is calculated to arrive at the magnetic field per unit transmitter moment at the receiver coil 15 or, alternatively, the conductivity of an isotropic homogeneous formation that would result in such a magnetic field per unit transmitter moment. Thus, an output of the tool 10 is obtained together with what that tool output represents in terms of magnetic field per unit moment or "apparent" conductivity. The multiplicative calibration factor is obtained using this information.

Since the logging tool 10 shown in FIG. 1 has three orthogonal transmitter coils 11 and three orthogonal receiver coils 15, there are nine possible combinations of coupling in a complex formation. A calibrator device used to calibrate the logging tool 10 may be a multi-loop device or a single-loop device. The single-loop device can provide the nine required calibration signals, but it requires extreme positioning accuracy to meet the specified accuracy of the service. The multi-loop device is configured to calibrate all the arrays in just one position, calling for a position accuracy easily obtained by field personnel. Use of the calibrator device provides for obtaining the multiplicative calibration factors.

In actual practice, the calibrator measurement is taken as the difference between readings performed with the circuit of the calibrator loop closed and open. The difference reading of the calibrator loop subtracts the environmental effects from the calibrator measurement allowing this task to be performed in a less limiting condition, i.e., near ground level, without compromising the calibration accuracy and with improved safety.

Figure 2:
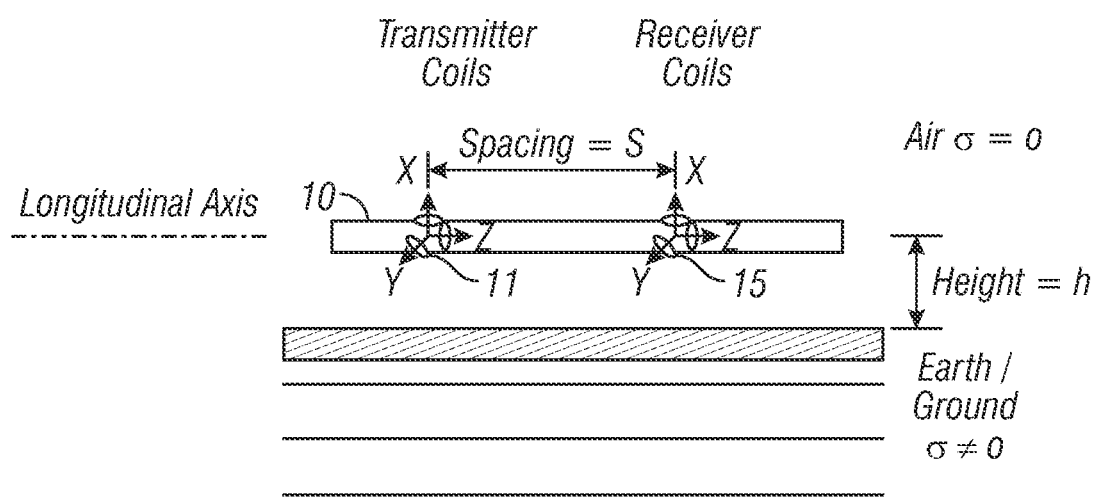
FIG. 2 depicts aspects of the induction logging tool disposed above the surface of the earth for calibration.

Reference may now be had to FIG. 2, which depicts aspects of calibrating the induction logging tool 10 in a low conductivity environment. The tool 10 is disposed horizontally at a height h above a surface plane of the earth 3. The longitudinal axis (Z-axis) of the tool 10 is parallel to the surface plane of the earth 3. One transmitter coil 11 and one corresponding receiver coil 15 are oriented so that their magnetic moments are parallel to the Z-axis. The other two mutually orthogonal axes are designated the X-axis and the Y-axis as shown in FIG. 2. The transmitter coils 11 are spaced a distance S from the receiver coils 15 along the longitudinal axis of the tool 10. The location of the tool 10 is such that other metal objects or sources of interference are far enough away so as to not influence the calibration measurements. Air surrounding the tool 10 has a conductivity of zero, while the ground below the tool 10 has a conductivity above zero.

In one embodiment of the calibration, the tool 10 is placed so that the X-axis points upwards or downwards (i.e., normal to the plane of the earth). In this configuration, it can be shown that the following mathematical relationships express the operation of the tool 10:

$$H_{XX} - H_{YY} = H_{ZZ}; \quad (1)$$

and $$Q(Nh) = \frac{H_{ZZ}(Nh)}{H_{YY}(Nh)}; \quad (2)$$

where $H_{XX}$, $H_{YY}$ and $H_{ZZ}$ are the magnetic field measurements performed using the receiver coils 15, $H_{YY}(Nh)$, $H_{ZZ}(Nh)$ and $Q(Nh)$ are the magnetic fields and their ratio as function of the normalized height above the plane of the ground (Nh=Height/Spacing). These relationships have been observed using modeling programs and verified theoretically.

In terms of measured conductivities, the relationships equivalent to equations (1) and (2) are:

$$\sigma_{XX} - \sigma_{YY} = 2\sigma_{ZZ}; \quad (3)$$

and $$Q(Nh) = \frac{2 \cdot \sigma_{ZZ}(Nh)}{\sigma_{YY}(Nh)}; \quad (4)$$

where $\sigma_{XX}$, $\sigma_{YY}$ and $\sigma_{ZZ}$ are the corresponding conductivities.

The above relations (1), (2), (3), and (4) can be used to calibrate the induction logging tool 10 that is a triaxial induction tool in the embodiment of FIGS. 1 and 2 without prior knowledge of the calibration area's ground conductivity.

Assuming that the tool 10 is in the position with the X-coils pointing upwards as depicted in FIG. 2 and that the multiplicative calibration factors were already obtained with the difference reading performed with the circuit of the calibrator loop closed and open, then the measured magnetic fields $\tilde{H}_{XX}$, $\tilde{H}_{YY}$ and $\tilde{H}_{ZZ}$ are:

$$\tilde{H}_{XX} = H^0{}_{XX} + \delta_{XX}; \tilde{H}_{YY} = H^0{}_{YY} + \delta_{YY}; \tilde{H}_{ZZ} = H^0{}_{ZZ} + \delta_{ZZ}$$

where $\delta_{XX}$, $\delta_{YY}$ and $\delta_{ZZ}$ are the corresponding additive errors (i.e., sonde errors) since the multiplicative errors were already corrected with the multiplicative calibration factors determined with the loop calibrations.

Next, the tool 10 is rotated through 90 degrees around the tool axis (Z-axis) so that Y-axis points upwards from (or downwards towards) the ground surface. The XX and YY components now interchange their roles as follows:

$$\tilde{H}_{XX} = H^{90}{}_{yy} + \delta_{yy}; \tilde{H}_{YY} = H^{90}{}_{xx} + \delta_{xx}; \text{ and } \tilde{H}_{ZZ} = H^{90}{}_{zz} + \delta_{ZZ}.$$

Now $H_{ZZ}$ can be obtained with equation (1) from the measured values of either array XX or YY, with the values from the two positions. Notice that the errors, $\delta_{XX}$ and $\delta_{YY}$ cancel out in this process and that $H_{ZZ}$ is the ground effect that is sought after.

$$H_{ZZ} = \tilde{H}_{XX} - \tilde{H}_{YY} = H^0{}_{xx} + \delta_{xx} - (H^{90}{}_{xx} + \delta_{xx}) = H^0{}_{xx} - H^{90}{}_{xx} \text{ (Ground effect Z-direction)}$$

$$H_{ZZ} = \tilde{H}_{XX} - \tilde{H}_{YY} = H^{90}{}_{yy} + \delta_{yy} - (H^0{}_{yy} + \delta_{yy}) = H^{90}{}_{yy} - H^0{}_{yy}$$
(Ground effect Z-direction)

The same process can be also performed with measurements acquired at four positions 0°, 90°, 180°, and 270° about the Z-axis then averaging the four $H_{ZZ}$ values obtained to further filter the result.

Next, using equation (2), $H_{YY}$ is determined as follows:

$$H_{YY} = H_{YY}(Nh) = \frac{H_{ZZ}(Nh)}{Q(Nh)} \text{ (Ground effect Y).}$$

Next using equation (1), $H_{XX}$ is determined as follows:

$$H_{XX} = H_{YY} + H_{ZZ} \text{(Ground effect X)}.$$

The calibration additive factors (sonde errors) for the triaxial induction tool 10 are then:

$$\delta_{XX} = \tilde{H}_{XX} - H_{XX}$$

$$\delta_{YY} = \tilde{H}_{YY} - H_{YY}$$

$$\delta_{ZZ} = \tilde{H}_{ZZ} - H_{ZZ}$$

The Q(Nh) is very close to 1 when Nh>>1. (See Appendix below.)

In one embodiment, the spacing between the transmitter coils 11 and the receiver coils 15 is about 1.6 meters and the height in air above the ground is about 10 feet or 3 meters. Hence, Nh=Height in air/spacing between transmitter coils 11 and receiver coils 15=3 m/1.6 m=1.905 and Q(1.905)= 0.954.

The "air" calibration conductivities show the following approximated relationships:

$$\sigma_{YY} \approx \frac{\sigma_{XX}}{2} \text{ and } \sigma_{ZZ} \approx \frac{\sigma_{YY}}{2}.$$

Figure 3:
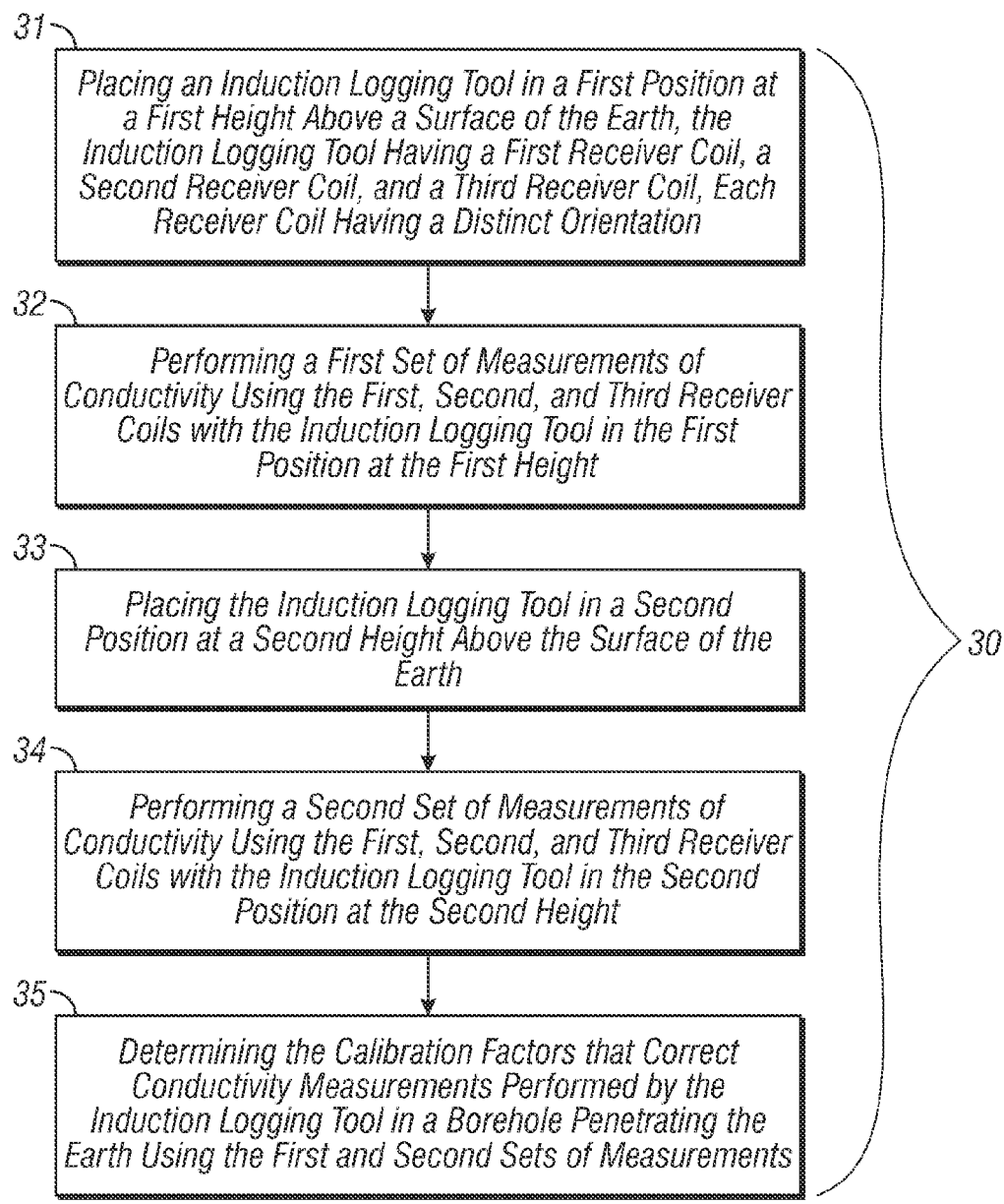
FIG. 3 presents one example of a method for determining calibration factors for the induction logging tool.

FIG. 3 presents one example of a method 30 for determining calibration factors of an induction logging tool. The method 30 calls for (step 31) placing the induction logging tool in a first position at a first height above a surface of the earth, the induction logging tool having a first receiver coil, a second receiver coil, and a third receiver coil, each receiver coil having a distinct orientation. Further, the method 30 calls for (step 32) performing a first set of measurements of conductivity using the first, second, and third receiver coils with the induction logging tool in the first position at the first height. Further, the method 30 calls for (step 33) placing the induction logging tool in a second position at a second height above the surface of the earth. Further, the method 30 calls for (step 34) performing a second set of measurements of conductivity using the first, second, and third receiver coils with the induction logging tool in the second position at the second height. Further, the method 30 calls for (step 35) determining the calibration factors that correct conductivity measurements performed by the induction logging tool in a borehole penetrating the earth using the first and second sets of measurements.

It can be appreciated that while the above discussion presented embodiments in which one receiver coil 15 is oriented normal to the ground plane, in other embodiments that receiver coil 15 may be oriented at an angle other than normal to the ground plane. In these other embodiments, the calibration factors can be determined using projections of a magnetic field, whether transmitted or received, that are aligned with the appropriate X, Y, or Z axis of interest.

APPENDIX

Figure 4:
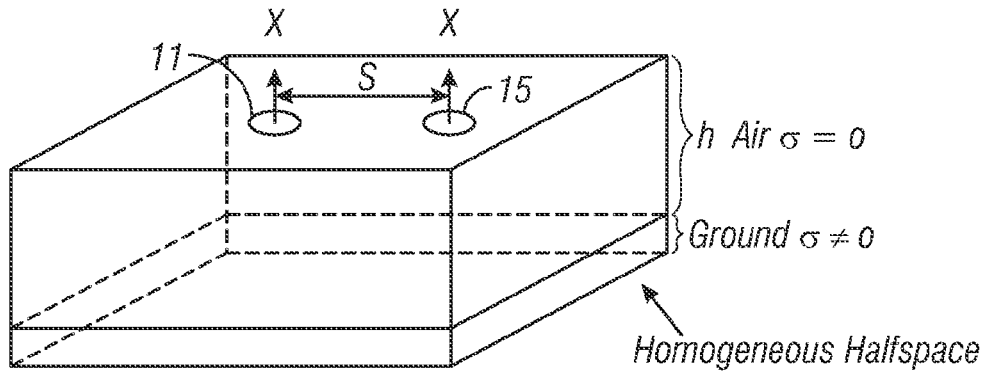
FIG. 4 depicts aspects of a relative vertical response of a dipole system.

This appendix presents responses of the induction logging instrument 10 in a homogeneous halfspace. Equation (5) describes the relative vertical response of a dipole system (shown in FIG. 4) as a function of the normalized distance Nh.

$$\phi_V(Nh) := \frac{4 \cdot Nh}{(4 \cdot Nh^2 + 1)^{\frac{3}{2}}} \quad (5)$$

Figure 5:
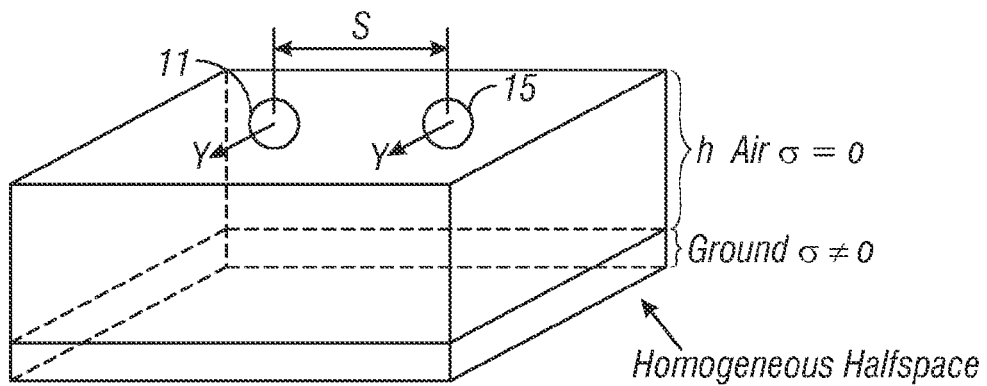
FIG. 5 depicts aspects of a relative horizontal response of a dipole system.

Equation (6) describes the relative horizontal response of a dipole system (shown in FIG. 5) as a function of the normalized distance Nh.

$$\phi_H(Nh) := 2 - \frac{4 \cdot Nh}{(4 \cdot Nh^2 + 1)^{\frac{1}{2}}} \quad (6)$$

Equations (5) and (6) can be extended to describe a three coil system with a backing ratio ζ (main coil spacing/backer coil spacing) as the following equations.

$$\phi_{Vertical}(Nh) := \frac{4 \cdot Nh}{(4 \cdot Nh^2 + 1)^{\frac{3}{2}}} - \frac{\frac{4 \cdot Nh}{\zeta}}{\left[4 \cdot \left(\frac{Nh}{\zeta}\right)^2 + 1\right]^{\frac{3}{2}}}$$

$$\phi_{Vertical}(Nh) := \frac{4 \cdot Nh}{(4 \cdot Nh^2 + 1)^{\frac{3}{2}}} - \frac{\frac{4 \cdot Nh}{\zeta}}{\left[4 \cdot \left(\frac{Nh}{\zeta}\right)^2 + 1\right]^{\frac{3}{2}}}$$

The cumulative response is obtained through the integration of the relative response in the interval from the normalized height Nh to infinity as shown in the following equations.

$$R_{Hor}(Nh) := \int_{Nh}^{\infty} \phi_{Horizontal}(Nh) dNh$$

$$R_{Ver}(Nh) := \int_{Nh}^{\infty} \phi_{Vertical}(Nh) dNh$$

Figure 6:
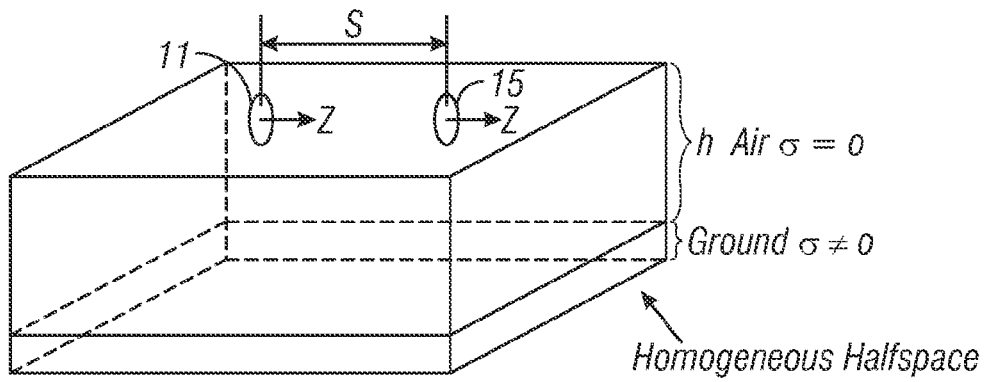
FIG. 6 depicts aspects of a cumulative response obtained from the vertical and horizontal responses.

Referring to FIG. 6, the cumulative response of the ZZ coils can be obtained from the responses of the vertical and horizontal responses as shown in the following equation.

$$R_Z(Nh) := R_{Ver}(Nh) - R_{Hor}(Nh)$$

Figure 7:
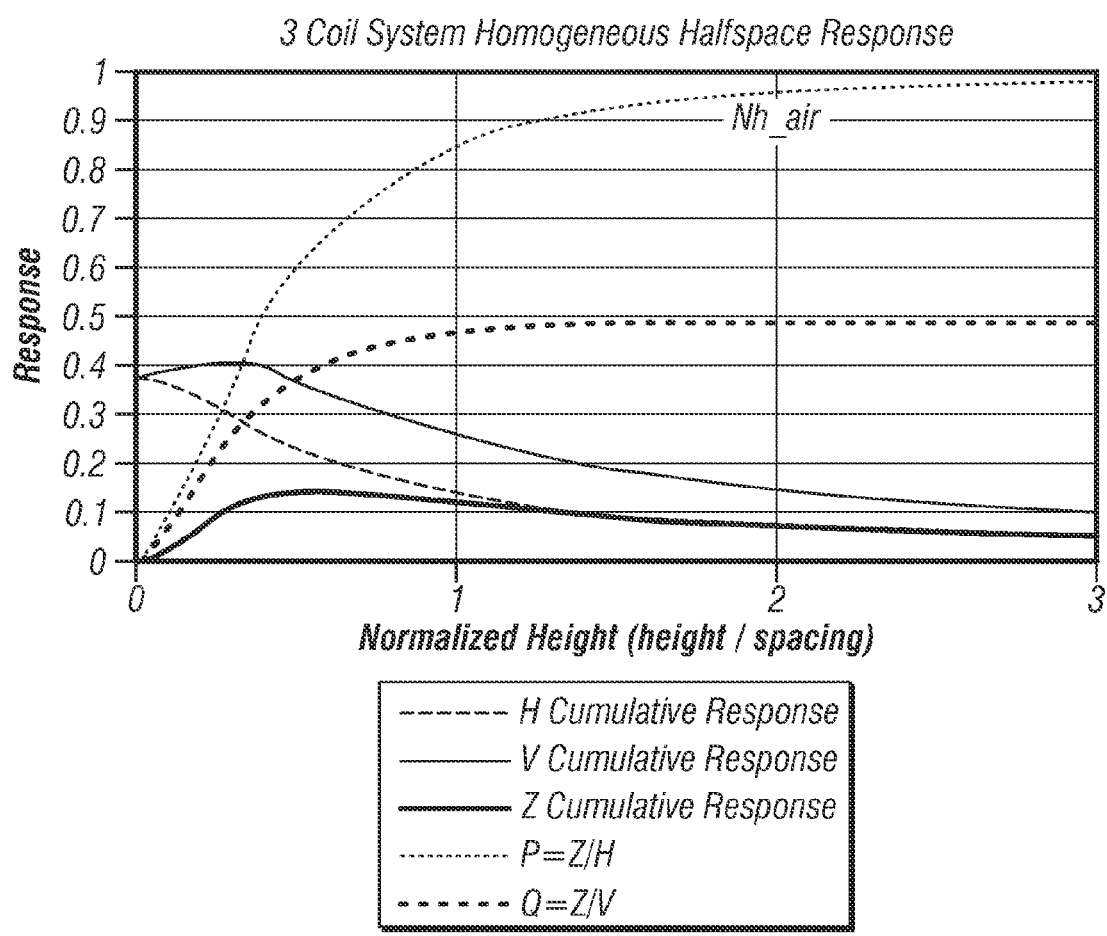
FIG. 7 illustrates a graph of a homogeneous halfspace response of the induction logging tool.

With the P response and the Q response defined as follows, a graph illustrating the various responses as a function of the normalized height in the three coil system is shown in FIG. 7.

$$P(Nh) := \frac{R_Z(Nh)}{R_{Hor}(Nh)}$$

$$Q(Nh) := \frac{R_Z(Nh)}{R_{Ver}(Nh)}$$

The vertical line at Nh=1.905 in FIG. 7 shows the responses for the embodiment of the induction logging tool 10 having an air calibration height of 10 feet and a spacing of 1.6 meters.

In support of the teachings herein, various analysis components may be used, including a digital and/or an analog system. For example, the downhole electronics 5 or the surface computer processing system 6 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling one device to another device either directly or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining calibration factors of an induction logging tool, the method comprising:
    placing the induction logging tool in a first position at a height above a surface of the earth, the induction logging tool comprising a first receiver coil, a second receiver coil, and a third receiver coil, each receiver coil having a distinct orientation;
    performing a first set of measurements of conductivity using the first, second, and third receiver coils with the induction logging tool in the first position at the height;
    placing the induction logging tool in a second position that is rotated about a longitudinal axis of the tool from the first position at the same height above the surface of the earth;
    performing a second set of measurements of conductivity using the first, second, and third receiver coils with the induction logging tool in the second position at the same height; and determining the calibration factors that correct conductivity measurements performed by the induction logging tool in a borehole penetrating the earth using the first and second sets of measurements.

2. The method according to claim 1, wherein the measurements in each of the first and second sets of measurements are performed sequentially.

3. The method according to claim 1, wherein the first receiver coil, the second receiver coil, and the third receiver coil are substantially mutually orthogonal to each other.

4. The method according to claim 3, wherein a moment of the first receiver coil is aligned along an X-axis, a moment of the second receiver coil is aligned along a Y-axis, and a moment of the third receiver coil is aligned along a Z-axis that is aligned along a longitudinal axis of the induction logging tool.

5. The method according to claim 4, wherein the X-axis is aligned vertically.

6. The method according to claim 5, wherein the second position results from rotating the induction logging tool ninety degrees about the longitudinal axis from the first position.

7. The method according to claim 6, wherein each of the calibration factors is an additive factor that is added to a conductivity measurement performed by a corresponding receiver coil to provide a calibrated conductivity measurement.

8. The method according to claim 7, wherein each additive factor $\delta_{XX}$, $\delta_{YY}$, and $\delta_{ZZ}$ are determined using the following equations, the superscript 0 referring to the first position, the superscript 90 referring to the second position, and ~ referring to a measurement of a magnetic field resulting from induction:

$$H_{XX} - H_{YY} = H_{ZZ}$$

$$Q(Nh) = \frac{H_{ZZ}(Nh)}{H_{YY}(Nh)}$$

$$\tilde{H}_{XX} = H_{XX}^0 + \delta_{XX}$$

$$\tilde{H}_{YY} = H_{YY}^0 + \delta_{YY}$$

$$\tilde{H}_{ZZ} = H_{ZZ}^{90} + \delta_{ZZ}$$

$$[H_{ZZ} = \tilde{H}_{XX} - \tilde{H}_{YY} = H_{XX}^0 + \delta_{XX} - (H_{XX}^{90} + \delta_{XX}) = H_{XX}^0 - H_{XX}^{90} \text{ or } H_{ZZ} =$$
$$\tilde{H}_{XX} - \tilde{H}_{YY} = H_{yy}^{90} + \delta_{yy} - (H_{yy}^0 + \delta_{yy}) = H_{yy}^{90} - H_{yy}^0]$$

$$H_{YY} = H_{YY}(Nh) = \frac{H_{ZZ}(Nh)}{Q(Nh)}$$

$$H_{XX} = H_{YY} + H_{ZZ}$$

$$\delta_{XX} = \tilde{H}_{XX} - H_{XX}$$

$$\delta_{YY} = \tilde{H}_{YY} - H_{YY}$$

$$\delta_{ZZ} = \tilde{H}_{ZZ} - H_{ZZ}.$$

9. The method according to claim 8, further comprising rotating the induction logging tool 180 degrees from the first position and performing a third set of measurements of conductivity and averaging the $H_{ZZ}$ values obtained from the first, second, and third sets of measurements to determine the additive factors.

10. The method according to claim 9, further comprising rotating the induction logging tool 270 degrees from the first position and performing a fourth set of measurements of conductivity and averaging the $H_{ZZ}$ values obtained from the first, second, third, and fourth sets of measurements to determine the additive factors.

11. The method according to claim 1, wherein a first transmitter coil is aligned with the first receiver coil, a second transmitter coil is aligned with the second receiver coil, a third transmitter coil is aligned with the third receiver coil, each transmitter coil being configured to transmit electromagnetic energy used to perform a conductivity measurement using a corresponding aligned receiver coil.

12. The method according to claim 11, wherein each of the transmitter coils is spaced a distance S from each of the receiver coils.

13. The method according to claim 1, wherein the height of the first position and the height of the second position are at least ten feet.

14. The method according to claim 1, further comprising determining multiplicative calibration factors prior to performing the first and second sets of measurements, and correcting the first and second sets of measurements using the multiplicative calibration factors.

15. The method according to claim 14, wherein determining the multiplicative calibration factors comprises using a calibration loop that magnetically couples a first transmitter coil to the first receiver coil, a second transmitter coil to the second receiver coil, and a third transmitter coil to the third transmitter coil to simulate a conductivity measurement.

16. A non-transitory computer readable medium comprising computer executable instructions for determining calibration factors of an induction logging tool by implementing a method comprising:
receiving a first set of measurements of conductivity performed using a first receiver coil, a second receiver coil, and a third receiver coil of the induction logging tool placed in a first position at a height above a surface of the earth;
receiving a second set of measurements of conductivity performed using the first receiver coil, the second receiver coil, and the third receiver coil of the induction logging tool placed in a second position that is rotated about a longitudinal axis of the tool from the first position at the same height above the surface of the earth;
determining the calibration factors that correct conductivity measurements performed by the induction logging tool in a borehole penetrating the earth using the first and second sets of measurements; and
providing the calibration factors as output.

17. The medium according to claim 16, wherein the method further comprises inputting multiplicative calibration factors used to correct the first set of measurements and the second set of measurements.

* * * * *